United States Patent
Botwright (10) Patent No.: US 12,429,033 B2
(45) Date of Patent: Sep. 30, 2025

(54) METHOD FOR EXCHANGING AN UP-TOWER MAIN COMPONENT OF AN OFF-SHORE WIND TURBINE

(71) Applicant: Vestas Wind Systems A/S, Aarhus (DK)

(72) Inventor: Adrian Botwright, Sabro (DK)

(73) Assignee: Vestas Wind Systems A/S, Aarhus N. (DK)

( * ) Notice: Subject to any disclaimer, the term of this patent is extended or adjusted under 35 U.S.C. 154(b) by 212 days.

(21) Appl. No.: 18/040,663

(22) PCT Filed: Jul. 27, 2021

(86) PCT No.: PCT/DK2021/050250
§ 371 (c)(1),
(2) Date: Feb. 6, 2023

(87) PCT Pub. No.: WO2022/033646
PCT Pub. Date: Feb. 17, 2022

(65) Prior Publication Data
US 2023/0313781 A1 Oct. 5, 2023

(30) Foreign Application Priority Data
Aug. 10, 2020 (EP) .................... 20190226

(51) Int. Cl.
*F03D 80/50* (2016.01)
*B63B 75/00* (2020.01)
(Continued)

(52) U.S. Cl.
CPC .............. *F03D 80/50* (2016.05); *B63B 75/00* (2020.01); *B63B 81/00* (2020.01); *B66C 23/52* (2013.01);
(Continued)

(58) Field of Classification Search
CPC ...... F03D 80/50; F03D 13/201; F03D 13/206; F03D 17/304; E02B 2017/0091; F05B 2240/95
See application file for complete search history.

(56) References Cited

U.S. PATENT DOCUMENTS

2010/0230370 A1* 9/2010 Schneider ............... B63B 27/10
701/50
2012/0282099 A1 11/2012 Munk-Hansen
2018/0022424 A1 1/2018 Engene et al.

FOREIGN PATENT DOCUMENTS

CN 208763821 U 4/2019
KR 101999500 * 7/2019

OTHER PUBLICATIONS

International Searching Authority, International Search Report and Written Opinion issued in corresponding PCT Application No. PCT/DK2021/050250, mailed on Sep. 24, 2021.
(Continued)

*Primary Examiner* — Nathaniel E Wiehe
*Assistant Examiner* — Maxime M Adjagbe
(74) *Attorney, Agent, or Firm* — Wood Herron & Evans LLP (57) ABSTRACT

In order to provide an improved and cost-efficient method for performing an exchange of up-tower main components on an off-shore wind turbine a method is disclosed in during which a non-permanent service platform is temporarily coupled to a wind turbine tower lower section. In addition, a wind turbine structure and a system including such a structure are described, the wind turbine structure and the respective system being designed to allow performing the described method.

14 Claims, 6 Drawing Sheets

(51) Int. Cl.
    *B63B 81/00*           (2020.01)
    *B66C 23/52*          (2006.01)
    *E02B 17/00*          (2006.01)
    *E04G 3/24*           (2006.01)
    *F03D 13/25*          (2016.01)

(52) U.S. Cl.
    CPC .......... *E02B 17/0034* (2013.01); *E04G 3/243* (2013.01); *F03D 13/25* (2016.05); *E02B 2017/0091* (2013.01); *F05B 2230/80* (2013.01); *F05B 2240/95* (2013.01)

(56) References Cited

OTHER PUBLICATIONS

European Patent Office, Extended European Search Report issued in corresponding EP Application No. 20190226.9, dated Feb. 9, 2021.

\* cited by examiner

METHOD FOR EXCHANGING AN UP-TOWER MAIN COMPONENT OF AN OFF-SHORE WIND TURBINE

The invention relates to a method for exchanging up-tower main components of an off-shore wind turbine (Main Component Exchange—MCE) during which a main component of the wind turbine is exchanged by a replacement part. The invention further relates to a wind turbine tower section specifically designed and prepared for performing the method and a system containing such a tower section.

The exchange of up-tower main components located in a nacelle of a wind turbine requires loosening, moving and lowering the up-tower component from the nacelle (deinstallation of the component to be replaced including lowering the component from the nacelle) and lifting into the nacelle, bringing into place and mounting for operation of the replacement component (reinstallation of the replacement part). Due to the high weight of up-tower main components of a wind turbine (a Generator may weigh about 30 tons and a Gearbox may weigh about 70 tons), an MCE procedure requires the use of very heavy machinery such as large cranes and/or heavy-duty winches which are not present on site. The limited lifting capacity of potential nacelle integrated lifting apparatuses is typically not sufficient for performing an MCE. Nacelle integrated lifting apparatuses such as cranes or winches are typically used for maintenance, are designed to be used in periodic inspection and have capacities capable of replacing only lightweight components of just a few tons. Building a nacelle with integrated heavy-duty lifting apparatuses that could handle the high weights of main components would lead to unacceptable costs for the building of the wind turbine, not to mention that in the best case in which no malfunction or failure of a main component occurs during the lifetime of the wind turbine there is no need for such heavy-duty lifting apparatuses in the first place.

In the case of off-shore wind turbines not only the relevant components need to be transported from land to the wind turbine and back to land with a vessel, but the heavy machinery needs to be brought to the wind turbine by sea and positioned in the vicinity of the wind turbine such that the vessel is in a sufficiently stabilized position (static support to avoid tilting and rolling of the vessel) and in a locally fixed position (influence of currents, waves, wind on the local position of the vessel) for handling the high weights in great height. Typically, for off-shore MCE operations jack-up vessels are used which have cranes high enough to reach to the top of the nacelle in order to be able to lower and to lift the components to be exchanged from and to the nacelle and which allow the lifting of the vessel's hull above water level. However, the operation of such a vessel is not only extremely costly, but a potential non-availability of such a vessel over a longer period of time may cause costly downtimes of the wind turbine.

In prior art different methods and strategies have been developed for conducting an MCE in a potentially cost-efficient way. One general strategy focusses on using nacelle integrated light-duty lifting apparatuses to lift heavy-duty equipment such as winches, trolleys or cranes into the nacelle. The heavy-duty equipment is then temporarily installed in the nacelle, thereby significantly increasing the capacity for lifting and movement of main components at least temporarily. The heavy-duty equipment is used to move within and to lower from and lift into the nacelle main components that are object of the MCE procedure. The heavy-duty equipment will be deinstalled after the MCE has been completed and may subsequently be used at a different wind turbine in another MCE procedure. Document WO 2018/041313 A1 describes a method during which prior to the actual exchange of the main component a temporary support for a nacelle integrated lifting apparatus is installed in order to increase the lifting capacity of the nacelle integrated lifting apparatus. European Patent EP 2 835 335 B1 is directed to a method in which heavy duty lifting equipment is lifted into the nacelle by a nacelle integrated light-duty hoist. However, the before-mentioned methods do not address the special requirements for performing an MCE on an off-shore wind turbine where the MCE needs to be performed at least partially from onboard a vessel.

It is therefore one object of the invention to provide an improved and cost-efficient method for performing an MCE on an off-shore wind turbine, in particular on an off-shore horizontal axis wind turbine (HAWT). It is a further object of the invention to provide a method for performing an MCE on an off-shore wind turbine that allows the wind turbine operator to react quicker and more flexible on a potential malfunction or failure of a main component. Yet another object of the invention is to provide a wind turbine structure and a system including such a structure, the wind turbine structure and the respective system being designed to allow performing such a method.

In one aspect, the invention is directed to a method for exchanging an up-tower component of an off-shore wind turbine with a replacement component, the off-shore wind turbine having a tower with a near and above water-level tower lower section, a nacelle with a nacelle structure directly or indirectly carrying the up-tower component. The method includes the steps of transporting the replacement component to the off-shore wind turbine with a vessel, and lowering the up-tower main component to be exchanged from the nacelle and lifting the replacement component to the nacelle. In order to address the above-mentioned problems, the method provides that prior to the exchange of the up-tower component with the replacement component a service platform is at least temporarily coupled to the tower lower section and the up-tower main component to be exchanged is lowered from the nacelle to the service platform and the replacement component is lifted from the vessel to the service platform.

Regarding the wind turbine structure designed to allow performing such a method the invention provides for a tower section for a tower of an off-shore wind turbine, the tower section being designed to form an above and near water-level tower lower section of an installed and completed off-shore wind turbine. In order to allow the performance of the above-mentioned method the tower lower section is provided with at least one of a non-permanent coupling structure and a supporting structure for the temporary non-permanent coupling and supporting of a temporary service platform to be non-permanently coupled to the tower lower section.

Consequently, the system for performing the before-mentioned method with a tower lower section as described above comprises a temporary service platform provided with at least one of a non-permanent coupling structure and a supporting structure corresponding to the at least one of a non-permanent coupling structure and supporting structure provided on the tower lower section.

The described method allows for the use of much smaller and therefore less costly operable vessels than those that would be needed to perform the MCE from the vessel only. The vessel used for performing the described method may therefore be a constantly floating vessel equipped with an on-vessel lifting apparatus. The vessel may also be a jack-up vessel equipped with an on-vessel lifting apparatus having a maximum effective working height of 30 m above water level or even just 25 m or 20 m above water level.

In a preferred embodiment, the on-vessel lifting apparatus comprises a heave compensated crane so as to allow the used vessel to be permanently floating during the MCE procedure, thereby avoiding the need to jack up the vessel's hull.

In one aspect of the invention, at least one component exchange-tool is lifted from the vessel to the service platform with an on-vessel lifting apparatus and the at least one component exchange-tool is lifted from the service platform to the nacelle using a nacelle-integrated lifting apparatus. The exchange tool may be any exchange tool or combination of exchange tools that serves to perform the heavy-duty tasks demanded during the MCE and may include but is not limited to cranes, temporary supports, winches, roller blocks, sleds or trolleys for horizontal movement of main components inside the nacelle, etc. Most preferably the at least one component exchange-tool comprises at least one of a heavy-duty lifting apparatus and a sliding tool.

Preferably, the nacelle and/or a component exchange-tool is aligned to the service platform via a yaw mechanism to align the nacelle or the component exchange-tool with the service platform.

In one aspect of the invention, the service platform is a temporary service platform which is transported to the wind turbine with a vessel and is coupled to the tower lower section using an on-vessel lifting apparatus and is decoupled from the tower lower section after completion of the exchange of the up-tower component with an on-vessel lifting apparatus. It is therefore sufficient for the operator of the wind turbine or any MCE service provider to only build a very limited amount of temporary service platforms.

In order to couple the temporary service platform to the wind turbine, the service platform may be coupled to the tower lower sections via a non-permanent coupling system which allows for easy de-coupling of the temporary service platform using on-vessel lifting apparatus such as an on-vessel crane after the MCE is completed.

The non-permanent coupling systems may in addition be designed to allow tool-less coupling of the service platform to the tower lower section so as to avoid the need to perform manual coupling work. Most preferably, in order to couple the service platform to the tower lower section the service platform may be gravity hooked onto the tower lower section. This makes it possible to place the platform in a certain orientation in relation to the lower tower section and to then let it slide into position under the force of gravity only. Of course, the coupling system will be designed such the service platform will rest in a statically stable state once it is decoupled from the lifting apparatus.

On advantage of the described method for exchanging an up-tower component of an off-shore wind turbine is the possibility to re-use the service platform so that a first MCE may be performed with the service platform on a first off-shore wind turbine and subsequently performing a second MCE on a second off-shore wind turbine using one and the same service platform, preferably without the vessel having to go back to shore after completion of the first MCE.

A system comprising a temporary service platform and a tower lower section suitable for providing the described method may be provided with at least one of a non-permanent coupling structure and a supporting structure corresponding to the at least one of a non-permanent coupling structure and supporting structure provided on the tower lower section. Preferably, the service platform has a platform section and a supporting strut, wherein at least one of the platform section and the supporting strut is designed to positively interlock with a corresponding coupling structure provided on the tower lower section. The corresponding non-permanent coupling structure and supporting structure on the tower lower section and the service platform are preferably designed to allow for a gravity driven hooking of the service platform to the tower lower section.

Various additional features and advantages of the invention will become more apparent to those of ordinary skill in art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention. In the accompanying drawings

Figure 1:
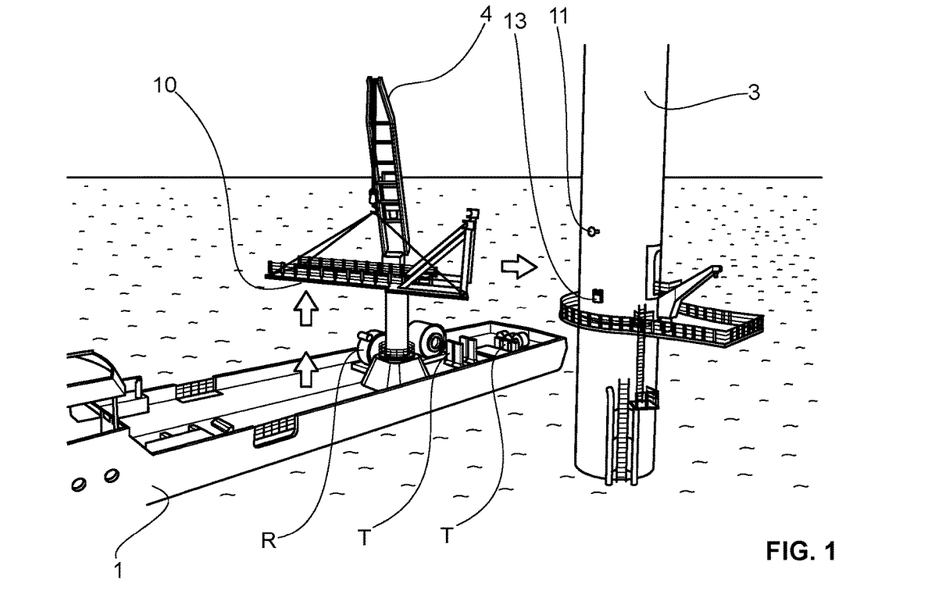
FIG. 1 depicts a permanently floating service vessel with an on-vessel crane in the vicinity of a wind turbine tower during the process of lifting a non-permanent service platform.

FIG. 1 illustrates a first step in a method for exchanging an up-tower component of an off-shore wind turbine with a replacement component. The off-shore wind turbine has a tower with a near and above water-level tower lower section 3 and a nacelle 2 (FIG. 3) with a nacelle structure directly or indirectly carrying the up-tower component. A service vessel 1 has transported to the off-shore wind turbine replacement components R as well as tools T that are to be used for deinstallation of main components E (FIG. 5) to be exchanged with the replacement components R. Also onboard the service vessel a temporary service platform 10 has been transported to the wind turbine site. Main components located in the nacelle may need to be exchanged for example due to failure and/or malfunction or simply due to the fact that they have reached the end of their predicted life-span so that they are replaced and then overhauled.

FIG. 1 illustrates that the service vessel 1 used is a relatively small and permanently floating vessel with an onboard crane 4 as on-vessel lifting apparatus. To minimize the influence of waves, wind and gravity forces of the items to be lifted the crane 4 may be a heave compensated crane. Of course, also small jack-up vessels can be used instead, which—as will become apparent by the following description—may be a small jack-up vessels since they will not need to reach higher than about 20 m to about 30 m above water level which is about where the temporary service platform 10 will typically need to be installed so that a working range from sea level to about 20 m to 30 m above sea level will suffice for successfully performing the MCE procedure.

Figures 2, 2A:
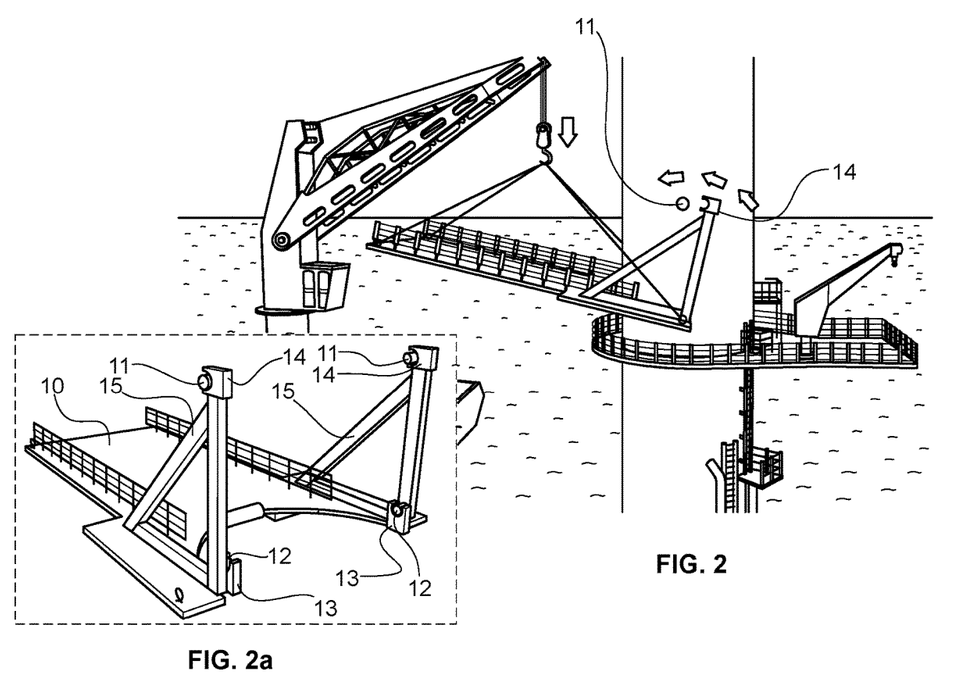
FIG. 2 depicts the non-permanent service platform in the process of installation to the wind turbine tower lower section.
FIG. 2a shows details of the design of the temporary service platform and its interaction with the wind turbine tower lower section.

FIG. 2 illustrates how the temporary service platform 10 is coupled to the wind turbine tower lower section. FIG. 2a shows further details of the coupling structure. On the outside wall of the wind turbine tower and near and above water level coupling means in the form of an upper coupling bolt 11 and a lower coupling plate 13 with an upwardly facing opening are mounted, preferably welded on. As shown in FIG. 2a, the temporary service platform 10 provides for corresponding coupling means in form of a plate 14 with an opening to engage with bolt 11 and a coupling bolt 12 which is to interact with the coupling bolt 13 provided on the wind turbine tower lower section 3.

It is apparent from FIG. 2 and FIG. 2a that the temporary service platform may be installed in a statically stable manner without any additional tooling. The weight of the service platform combined with its design and placement of the corresponding coupling means 12 and 14 cause a static gravity induced forces that are supported by the coupling means on the tower which will hold the service platform securely in place. Of course, additional security means, such as additional bolts or screws ensuring that even under most unfavorable circumstances the bolts 11, 12 will not accidently slide out the opening provided in plates 13, 14 may be used (see also FIG. 9a).

Figure 3:
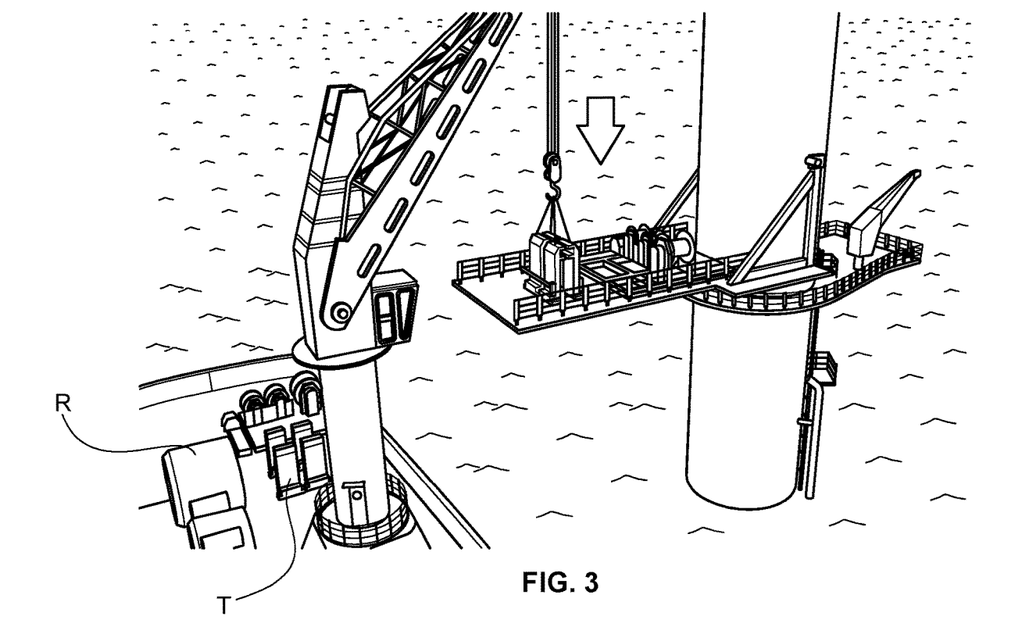
FIG. 3 shows placement of main components and/or component exchange-tools onto the service platform.
Figure 4:
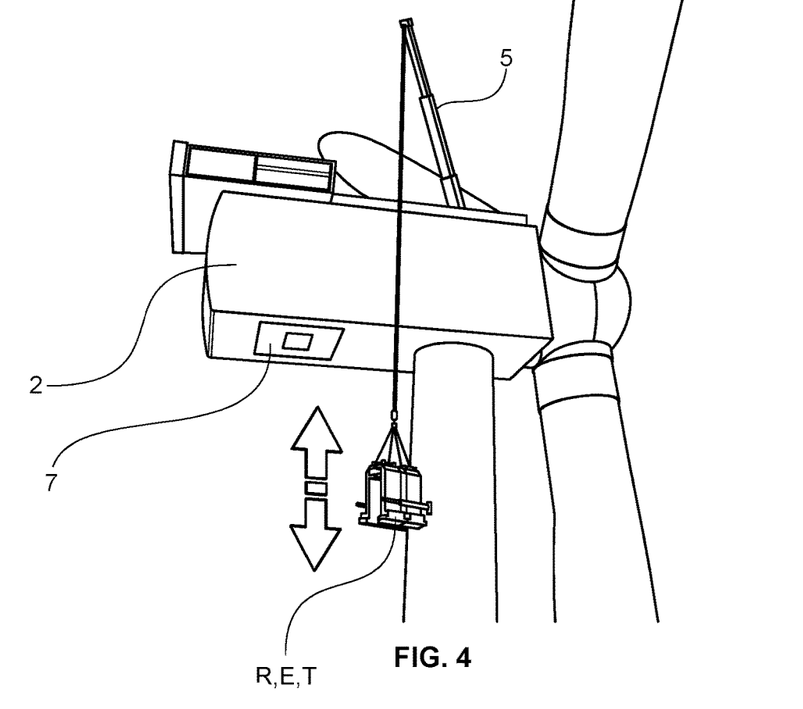
FIG. 4 depicts the lifting of main components and/or component exchange-tools into the nacelle by means of a crane, and FIG. 5/5a show the lifting of main components and/or component exchange-tools into the nacelle through a hatch by means of a winch.
Figures 5, 5A:
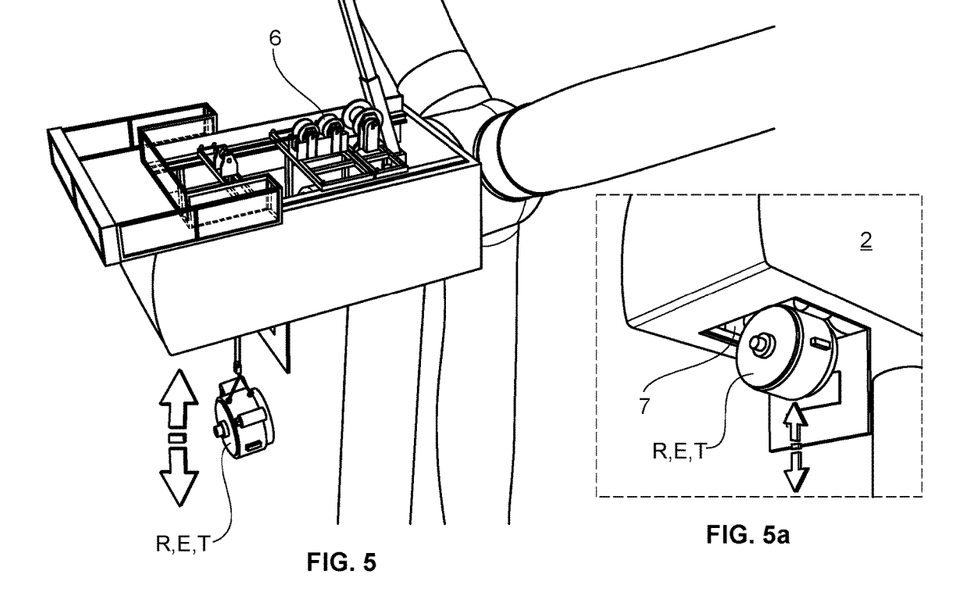

FIG. 3 shows how replacement components R and/or tools T needed for deinstallation of up-tower main components are loaded from the service vessel to the service platform after the installation of the service platform to the wind turbine tower 1 has been completed. FIG. 4, FIG. 5 and FIG. 5a illustrate that different replacement components R, exchange-tools T and main components to be exchanged E are lifted from the service platform 10 into the nacelle 2 or vice versa. The different components shown in FIG. 4, FIG. 5 and FIG. 5a are of exemplary nature only. Each of the shown components may be a replacement component R that shall replace an up-tower main component, or an exchange-tool T or a component to be exchanged E. The component actually shown in the Figures is of exemplary nature only.

The nacelle 4 may be provided with a nacelle integrated nacelle-crane 5 and/or with nacelle integrated winches 6. The nacelle-crane 5 may lift the component form the service platform past the nacelle 2 and then lower it into the nacelle from the top (or vice versa in case a component is to lifted out or the nacelle and to be lowered to the service platform) as derivable from FIG. 4 or the nacelle-crane 5 may, just as the winches 6 in FIG. 5 and FIG. 5a, may lift the component into the nacelle 2 or lower it from the nacelle 2 to the service platform through a hatch opening 7. It is noted that nacelle-crane 5 and winches 6 may also represent part of an exchange-tool that has been lifted into and installed in or on the nacelle to increase the weight capacity of the lifting apparatuses actually permanently present in the nacelle 2.

Figure 6:
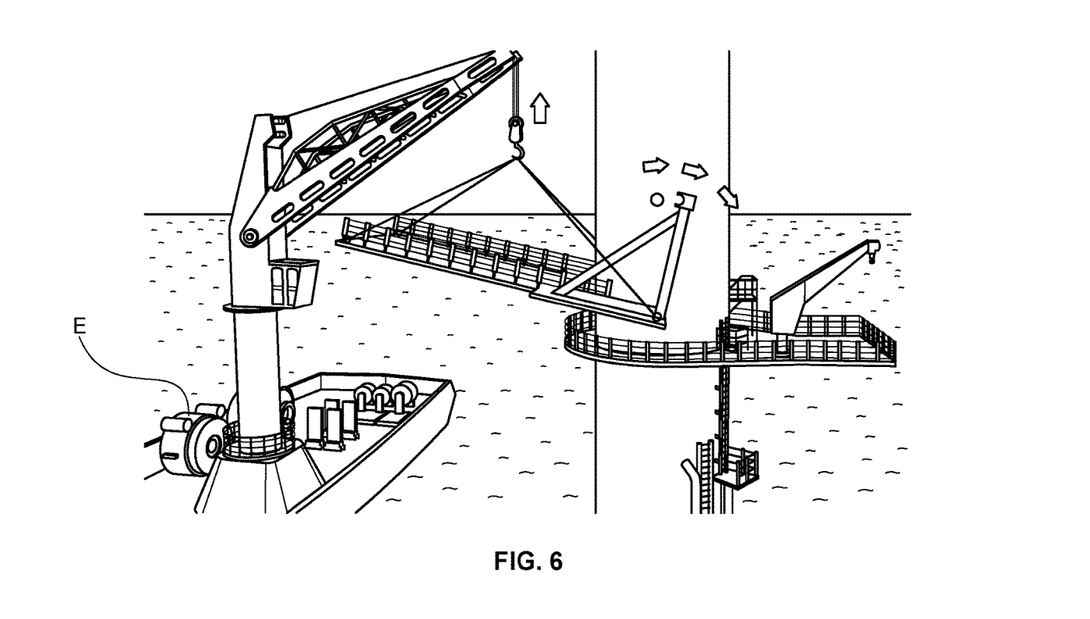
FIG. 6 illustrates the decoupling of the temporary service platform from the wind turbine tower lower section by means of the on-vessel lifting apparatus.

FIG. 6 illustrates how the temporary service platform 10 is deinstalled from the wind turbine tower lower section 1 after all exchanged main components E and exchange tools have been loaded form the service platform onboard the vessel 1. The platform 10 is first tilted such that the coupling plate 14 on the temporary service platform disengages from the coupling bolt 11 while the platform is rotating around the coupling bolt 12 which is resting in the coupling plate 13 on the wind turbine tower (FIG. 5a for details). The platform 10 may then be lifted such that bolt 12 disengages from opening in plate 13 and can be guided past bolt 11 and plate 14 in a tilted position an be placed back on board the vessel.

Figure 7:
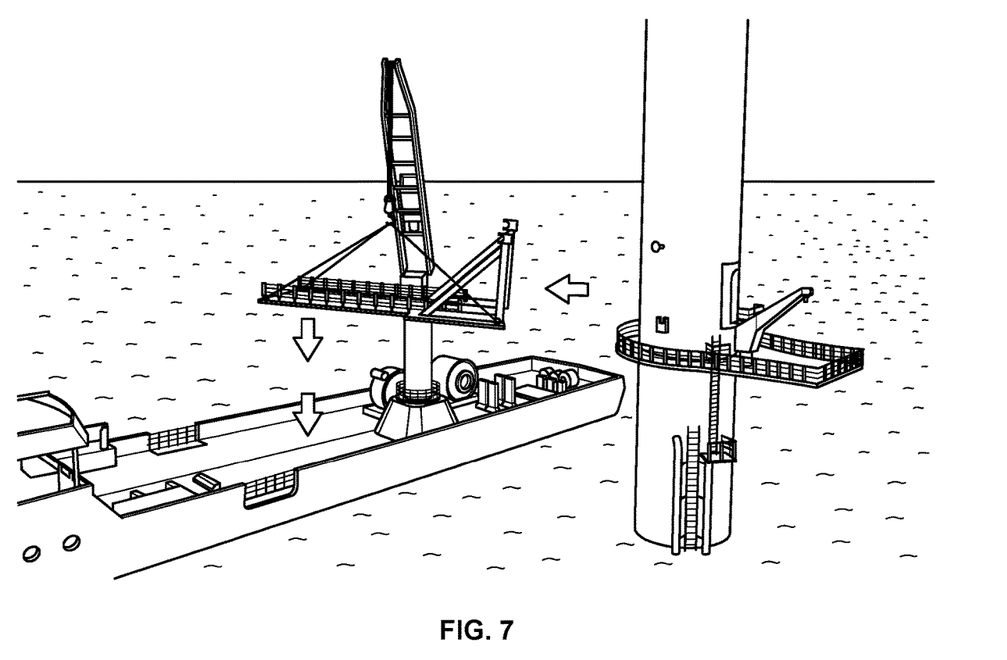
FIG. 7 depicts the loading of the temporary service platform onboard the service vessel.

FIG. 7 then shows the deinstalled temporary service platform in the process of being placed back on board the service vessel for transport back to a harbor or to another MCE site.

Figure 8:
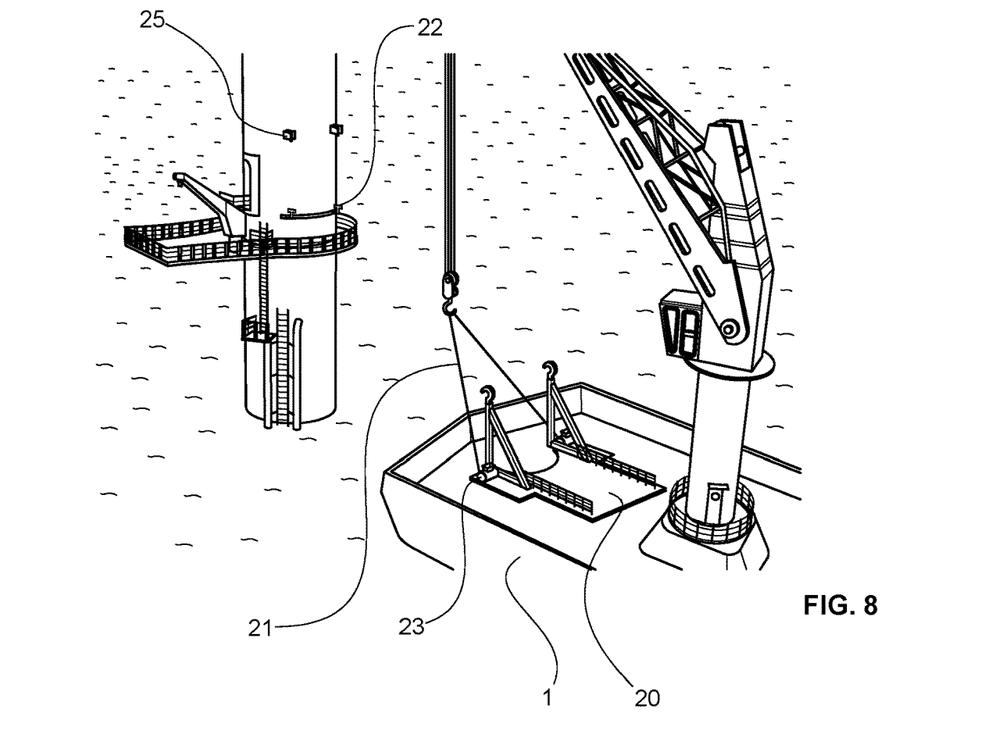
FIG. 8 shows an alternative design of a temporary service platform to be coupled to the wind turbine tower lower section.
Figures 9, 9A:
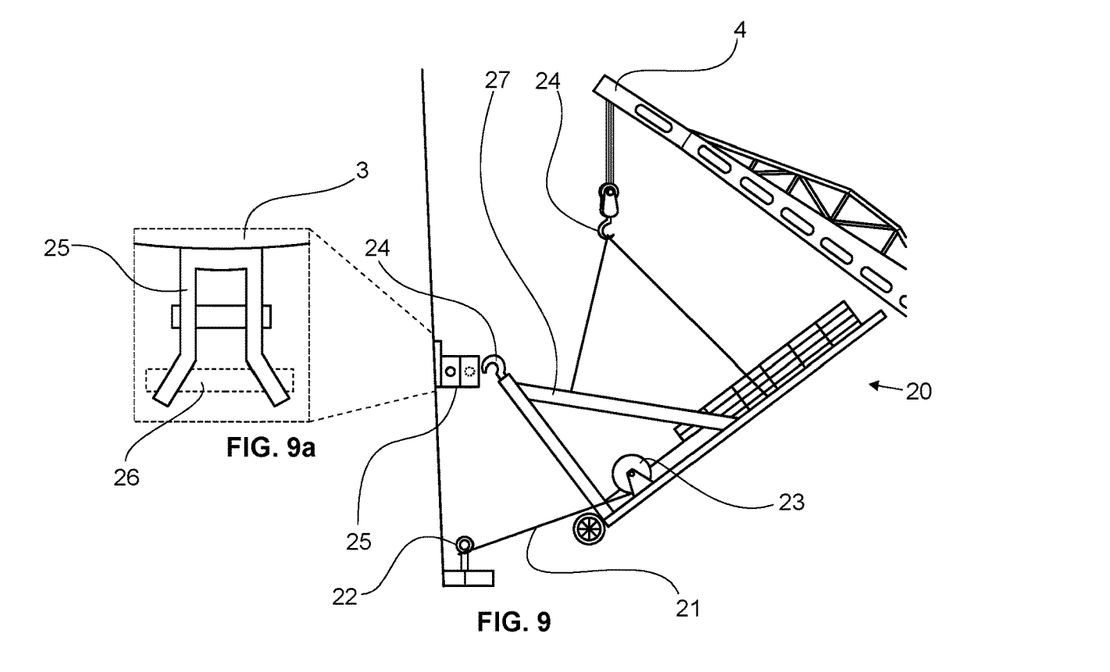
FIG. 9 illustrates the coupling of the service platform also shown in FIG. 8 to the wind turbine tower lower section.
FIG. 9a depicts details of a coupling structure provided on the wind turbine tower lower section.

FIG. 8 and FIG. 9 illustrate an alternative service platform design and an alternative way to install a service platform 20 on the wind turbine tower lower section. The service platform 20 will preferably be positioned near the stem of the service vessel 1 such that the service vessel can approach the wind turbine tower backwards and such that potential rolling of the vessel due to the weight of the service platform acting on the hull of the vessel once lifted by the on vessel lifting apparatus can be avoided.

Prior to lifting the service platform 20 with the on-vessel crane 4 a guide rope 21 will be placed over guidance hooks 22 that are located on the wind turbine tower lower section 1. When the guide rope 21 is in engagement with the guidance hooks 22 and once the service platform 20 is lifted with the on-vessel crane 4—and/or moreover during the lift with the on-vessel crane 4—a platform winch 23 located on the service platform is used to drag the service platform in direction towards the tower 1 in a controlled movement. While approaching the tower the service platform is tilted such that an upper coupling hook 24 approaches an upper coupling means such as the upper U-shaped mounting fixture 25 first. The service platform 20 may be engaged into the mounting fixture 25 and by slowly letting the service platform sink and thereby tilt such that also the lower part of the service platform adjacent to the tower will approach the tower until it finally comes to a statically stable position in which it rests against the tower wall.

Two platform winches 23 are illustrated, one towards each side of the platform. After installation of the platform, e.g. in the herein exemplified manners, the guide ropes in these winches, or other guide rope(s), can be drawn upwards by a nacelle integrated lifting apparatus and attached to the nacelle structure or a structure fixedly connected to the nacelle structure, e.g. to a fixture of the nacelle or to a fixture on lifting equipment in or on the nacelle. The guide ropes drawn upward may be used as guide ropes or wires serving to guide components while lifting or lowering the respective component to or from the nacelle. For this purpose the components to be lifted or lowered may engage with the guide ropes or wires such that they are slidable along them in order to control any movement of the components in a horizontal or substantially horizontal direction during their descent or ascent. Possibly, pulleys operably positioned somewhat away from the guide wire winches and somewhat away from the tower, can be used to provide a proper distance of the guide wires from the tower when the guide wires are used during component exchange.

As shown in FIG. 9a the preferably U-shaped mounting fixture 25 has an opening that widens with increasing distance from the tower wall and may therefore act as guiding aid when lifting the service platform into place. Optionally, an additional securing bolt 26 (schematically illustrated by dotted lines) may be used and positioned after the service platform is in place to ensure that the service platform is safely held in place even under most unfavorable conditions.

Figure 10:
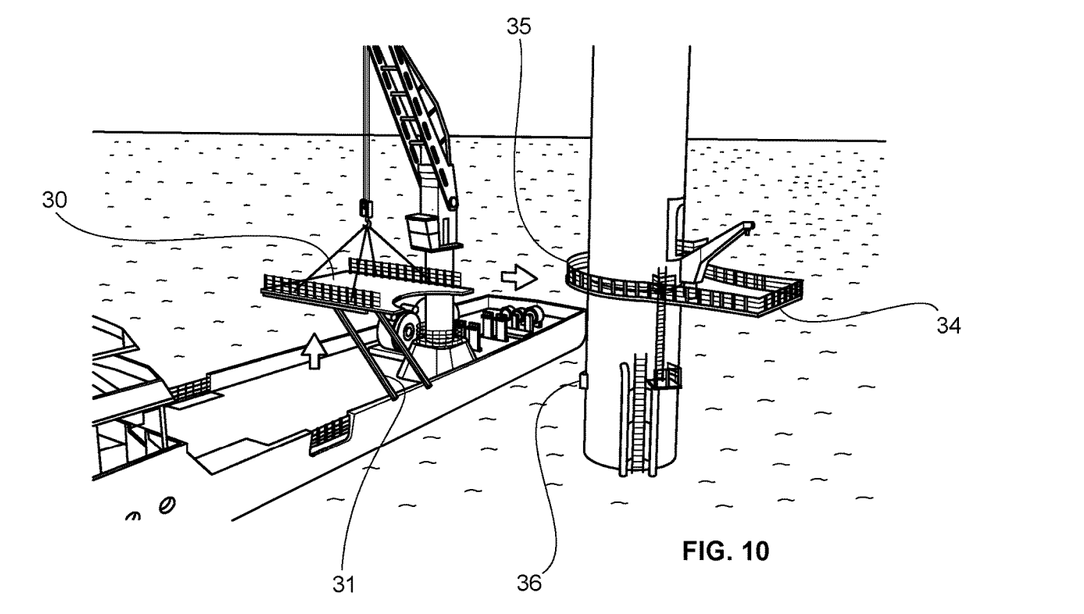
FIG. 10 shows yet another alternative design of a temporary service platform to be installed on the wind turbine tower lower section.
Figure 11:
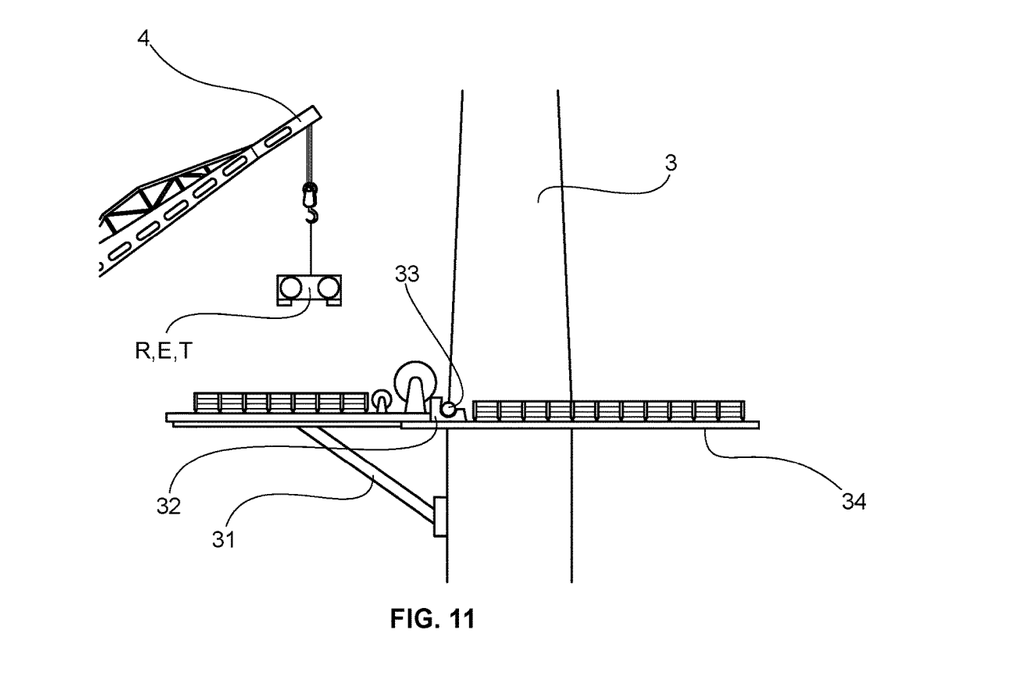
FIG. 11 illustrates the temporary service platform also shown in FIG. 10 in installed position and coupled to the wind turbine tower lower section.

Yet another alternative of a service platform design is depicted in FIG. 10 and FIG. 11.

Other than service platform 10 shown in FIG. 1 to FIG. 7 and service platform 20 shown in FIG. 8 and FIG. 9, the service platform 30 shown in FIG. 10 and FIG. 11 does not have upwardly directed and tensile loaded carrier struts 15 or 27 but downwardly directed pressure loaded carrier struts 31. Also, the coupling means on the wind turbine tower—in FIG. 10 and FIG. 11 a mounting plate 32 with an opening to be engaged by a bolt 33 positioned on the service platform 30 is shown as a mere example—are not positioned directly on the wind turbine tower wall but on a permanent platform 34 with which the wind turbine is initially installed. In installed state, the carrier struts 31 rest against a strengthened section 36 of the wind turbine tower wall which may, in addition, have a coupling structure corresponding to the end of the carrier struts 31.

However, the service platform 30 can—just as the previously described platforms 10 and 20—be lifted from the vessel and coupled to the wind turbine lower section without the use of additional installation tooling and will, once properly installed, rest in a statically safe and stable position by means of gravity forces only. Again, additional securing means for ensuring that the service platform will remain in place even under highly unfavorable conditions, may be used.

For installation of the service platform 30 part of a railing 35 installed on the permanent platform 34 may or may not be temporarily removed. The permanent installation may or may not even comprise a permanent platform 34.

All Figures described above show that for performing an MCE the use of large jack-up vessels can be avoided by making use of a temporary service platform which can be temporarily installed by means of much smaller and even permanently floating service vessels. Such a procedure can save a significant amount of costs and fees for the operation and rent of an otherwise needed large jack-up vessel capable of reaching as far up as the nacelle and the components placed in the nacelle to be exchanged. This may also be of great benefit for floating wind turbine generators, where the sea-depth does now allow for use of a jack-up vessel.

While the present invention has been illustrated by the description of one or more embodiments thereof, and while the one or more embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific detail and illustrative examples shown and described. Accordingly, departures may be made from such details without departing from the scope of the general inventive concept.

LIST FOR REFERENCE NUMERALS

1 Service Vessel
2 Nacelle
3 Wind Turbine Tower lower section
4 On-Vessel Crane
5 Nacelle Crane
6 Winch
7 Hatch Opening
10 Temporary Service Platform
11 Coupling Bolt on Wind Turbine Tower
12 Coupling Bolt on Temporary Service Platform
13 Coupling Plate on Wind Turbine Tower
14 Coupling Plate on Temporary Service Platform
15 Carrier Strut
20 Temporary Service Platform
21 Guide Rope
22 Guidance Hook
23 Platform Winch
24 Coupling Hook
25 Upper Mounting Fixture
26 Securing Bolt
27 Carrier Strut
30 Temporary Service Platform
31 Carrier Strut
32 Coupling Plate
33 Coupling Bolt
34 Permanent Platform
35 Railing
36 Strengthened Section on Wind Turbine Tower
R Replacement Components
E Main Components to be exchanged
T Exchange-Tools

The invention claimed is:

1. A method for exchanging an up-tower component of an off-shore wind turbine with a replacement component, the off-shore wind turbine having a tower with a near and above water-level tower lower section having a permanent service platform, a nacelle with a nacelle structure directly or indirectly carrying the up-tower component, the method including the steps of
transporting the replacement component to the off-shore wind turbine with a vessel,
attaching a temporary service platform to the tower lower section on or adjacent the permanent service platform,
lowering the up-tower main component to be exchanged from the nacelle to the temporary service platform,
lifting the replacement component from the vessel to the temporary service platform,
lifting the replacement component from the temporary service platform to the nacelle, and
removing the temporary service platform from the tower lower section.

2. The method according to claim 1, wherein the vessel is a constantly floating vessel equipped with an on-vessel lifting apparatus.

3. The method according to claim 2, wherein the on-vessel lifting apparatus comprises a heave compensated crane.

4. The method according to claim 1, wherein at least one component exchange-tool is lifted from the vessel to the temporary service platform with an on-vessel lifting apparatus and that the at least one component exchange-tool is lifted from the temporary service platform to the nacelle using a nacelle-integrated lifting apparatus.

5. The method according to claim 4, wherein the at least one component exchange-tool comprises at least one of a heavy-duty lifting apparatus and a sliding tool.

6. The method according claim 1, wherein the nacelle and/or a component exchange-tool is aligned to the temporary service platform via a yaw mechanism to align the nacelle or the component exchange-tool with the temporary service platform.

7. The method according to claim 1, wherein the temporary service platform is transported to the wind turbine with the vessel and wherein attaching the temporary service platform to the tower lower section and removing the temporary service platform from the tower lower section is performed by an on-vessel lifting apparatus.

8. The method according to claim 1, wherein the temporary service platform is coupled to the tower lower section via a non-permanent coupling system.

9. The method according to claim 8, wherein the non-permanent coupling system is designed to allow tool-less coupling of the temporary service platform to the tower lower section.

10. The method according to claim 8, wherein for coupling the temporary service platform to the tower lower section, the service platform is gravity hooked onto the tower lower section.

11. The method according to claim 8, wherein the method for exchanging the up-tower component of the off-shore wind turbine is performed with the temporary service platform on a first off-shore wind turbine and is subsequently performed on a second off-shore wind turbine using one and the same temporary service platform.

12. A system for exchanging an up-tower component of an off-shore wind turbine with a tower lower section having a permanent service platform mounted thereto, the tower lower section or the permanent service platform mounted to the tower lower section is provided with at least one of a non-permanent coupling structure and a supporting structure for the temporary non-permanent coupling and supporting of a temporary service platform to be non-permanently coupled to the tower lower section, wherein the system comprises the temporary service platform provided with at least one of a non-permanent coupling structure and a supporting structure corresponding to the at least one of the non-permanent coupling structure and supporting structure provided on the tower lower section or the permanent service platform.

13. The system according to claim 12, wherein the temporary service platform has a platform section and a supporting carrier strut wherein at least one of the platform section and the supporting carrier strut is designed to positively interlock with a corresponding coupling structure provided on the tower lower section.

14. The system according to claim 12, wherein the corresponding non-permanent coupling structure and/or supporting structure on the tower lower section and the temporary service platform are designed to allow for a gravity driven hooking of the temporary service platform to the tower lower section.

\* \* \* \* \*